April 11, 1939. C. J. CONN 2,153,742
APPARATUS FOR QUICK FREEZING OF FOOD PRODUCTS
Filed March 18, 1937

INVENTOR.
Chester J. Conn
BY
ATTORNEY.

Patented Apr. 11, 1939

2,153,742

UNITED STATES PATENT OFFICE 2,153,742

APPARATUS FOR QUICK FREEZING OF FOOD PRODUCTS

Chester J. Conn, Smithtown Branch, N. Y.

Application March 18, 1937, Serial No. 131,555

3 Claims. (Cl. 62—104)

This invention relates to improvements in methods of an apparatus for refrigerating food products, being particularly directed to a novel assembly and operation permitting of quick freezing through brine spray contact with a maximum of heat exchange.

Up to the present time, particularly in quick freezing of food products, the same are carried in banks or series either in multiple conveyors or fixed shelves, and considerable losses are entailed both due to the passage of the refrigerant carrying heat extracted from the food products in one bank being discharged upon and contacting with the food products or the refrigerant in another bank and by the additive accumulation of foreign material withdrawn from the food product by the refrigerant as it passes from bank to bank.

Broadly, it is an object of this invention to provide a novel construction and operation incorporating refrigerant discharged contacting with the food products, wherein the spray immediately after contact and heat exchange with the food product is caused to be withdrawn from the freezing zone.

Specifically, it is an object of this invention to provide, in conjunction with a direct contact brine spray refrigerating operation and assembly, particularly as applied in multiple bank units for a baffle assembly between the respective banks, whereby the refrigerant spray after heat exchange with the food product acted upon is removed from the zone of action.

These and other advantages, capabilities and features of the invention will appear from the subjoined detailed description of one specific embodiment thereof illustrated in the accompanying drawing, in which—

Figure 1:
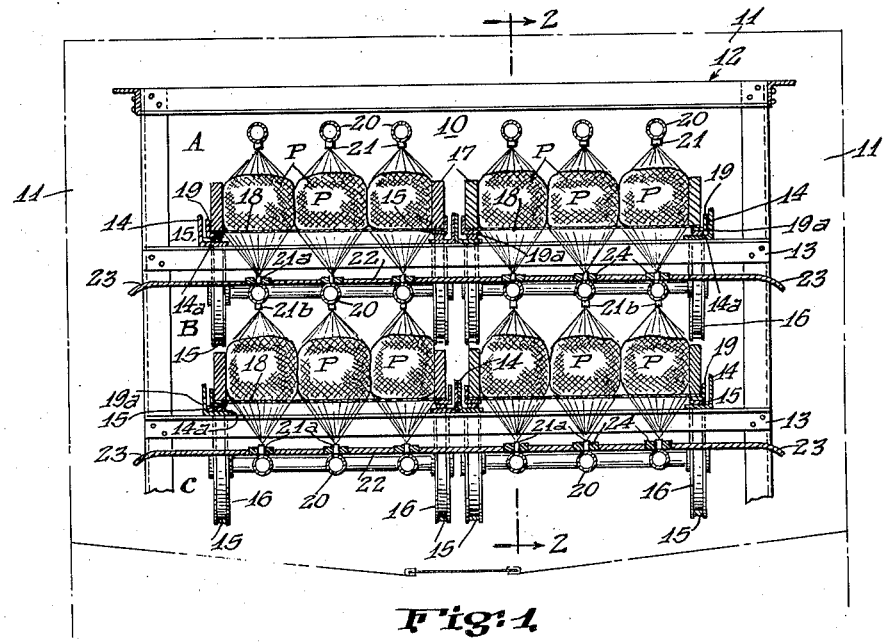
Figure 1 is a front elevation partly in section along lines 2—2 of Figure 2, showing a multiple conveyor assembly for quick freezing incorporating my apparatus.

Referring to the reference characters in the drawing, numeral 10 represents a freezing tunnel having the usual insulating walls 11 and having disposed therein a framework 12 for supporting the freezing and conveying mechanism.

Figure 2:
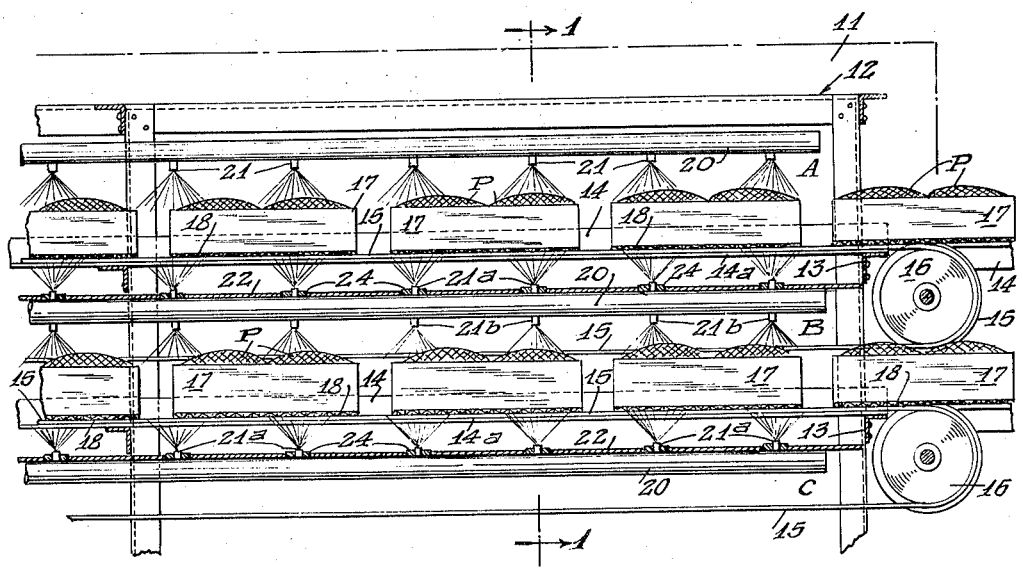
Figure 2 is a side elevation partly in section along lines 2—2 of Figure 1.

As indicated in Figures 1 and 2, the frame has a plurality of sections or banks A, B and C, defined by the horizontally spaced bars 13, upon which are mounted angle bars 14 forming spaced brackets. The horizontal legs 14a of the brackets 14 are adapted to serve as guides for the conveyor belts 15 mounted on and movable by means of pulleys 16 disposed at opposite ends of the chamber or tunnel. A freezing frame 17 comprising an open ended box carrying products P and supported on a perforate base 18 having an angle iron peripheral reinforcement 19, is adapted to be disposed so that the horizontal legs 19a of a freezing frame rest on the conveyor belt 15 and is carried through the chamber by the motion thereof.

Within each bank are disposed series of spaced refrigerant conduits 20 having spaced nozzles or orifices 21, the conduits in the intermediate bank B having plural orifices 21a and 21b diametrically opposed to one another so that refrigerant fluid may be discharged upon all exposed faces of the food products in all the banks, the freezing frames having perforate bases as aforesaid to permit brine spray contact at such areas.

Below each complete bank there is mounted, above and on the conduits a baffle plate 22 having a slight slope along its peripheral edges as at 23 so as to cause the brine spray discharged into each bank after heat exchange with the food products in such bank to pass directly into the well at the base of the chamber or tunnel, for straining and recooling, thus preventing the contact of any so-called used refrigerant with the products in another bank.

Figure 3:
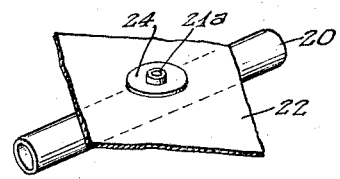
Figure 3 is a perspective view of the nozzle-baffle assembly.

As shown in Figures 1 and 3, the upstanding nozzles or orifices 21a pass through the baffle plate 22 and have a sealing washer assembly 24 disposed thereadjacent so that a sealed joint is formed to prevent passage of liquid into another bank.

Although the assembly herein disclosed relates to a multiple conveyor system defining the respective banks, the assembly herein shown may be applied in a freezing chamber, tunnel or cabinet incorporating fixed shelves or supports in bank formation.

It is obvious that various changes and modifications may be made to the details of construction without departing from the general spirit of the invention as set forth in the appended claims.

I claim:

1. In an apparatus of the class described, spaced carriers upon which food products are mounted in bank formation for treatment, conduits above and below said carriers and having spaced nozzles for discharging spray refrigerant from above and below on said food products, and separator plates disposed between the respective carriers to provide separate freezing zones for said food products, and serving to direct used spray refrigerant after heat exchange with the food products out of the respective freezing zones.

2. In an apparatus of the class described, spaced carriers upon which food products are mounted in bank formation for treatment, conduits having spaced nozzles for discharging spray refrigerant upon the surfaces of the food products being treated, and dished separator plates supported on said conduits and disposed between said carriers and providing separate freezing zones for said food products, said separator plates serving to direct the used spray refrigerant after heat exchange with the food products out of the respective freezing zones.

3. In an apparatus of the class described, spaced perforated conveyors upon which food products are disposed for movement in bank formation for treatment, conduits between the respective conveyors and having spaced and vertically opposed nozzles for discharging spray refrigerant upwardly and downwardly against the food products, and separator plates supported on said conduits for defining separate freezing zones for said food products and having apertures through which the upwardly extending nozzles of said conduits project for permitting discharge of refrigerant in a zone above the separator plates, said separator plates having downwardly sloping edges, whereby used spray refrigerant after heat exchange with the food products in the respective zones may be directed out of said zones and away from the remaining zones.

CHESTER J. CONN.